United States Patent
Bates et al.

(10) Patent No.: US 7,980,955 B2
(45) Date of Patent: Jul. 19, 2011

(54) METHOD AND APPARATUS FOR CONTINUOUS EXECUTION OF A GAME PROGRAM VIA MULTIPLE REMOVABLE STORAGE MEDIUMS

(75) Inventors: Richard Bates, London (GB); Antonio Garcia, London (GB)

(73) Assignee: Sony Computer Entertainment Europe Limited (GB)

( * ) Notice: Subject to any disclaimer, the term of this patent is extended or adjusted under 35 U.S.C. 154(b) by 938 days.

(21) Appl. No.: 11/662,509

(22) PCT Filed: Sep. 8, 2005

(86) PCT No.: PCT/GB2005/003477
§ 371 (c)(1),
(2), (4) Date: Sep. 25, 2007

(87) PCT Pub. No.: WO2006/027596
PCT Pub. Date: Mar. 16, 2006

(65) Prior Publication Data
US 2008/0139311 A1    Jun. 12, 2008

(30) Foreign Application Priority Data

Sep. 9, 2004 (GB) .................................. 0420017.6
Aug. 16, 2005 (GB) .................................. 0516807.5

(51) Int. Cl.
*A63F 13/00* (2006.01)
(52) U.S. Cl. .................................... 463/43; 434/307 A
(58) Field of Classification Search .................... 463/43; 434/307 A
See application file for complete search history.

(56) References Cited

U.S. PATENT DOCUMENTS

| | | | | |
|---|---|---|---|---|
| 5,711,672 A | * | 1/1998 | Redford et al. | 434/307 R |
| 5,732,067 A | * | 3/1998 | Aotake | 369/275.3 |
| 2003/0061607 A1 | * | 3/2003 | Hunter et al. | 725/32 |
| 2003/0217273 A1 | | 11/2003 | McGrath et al. | |
| 2004/0117523 A1 | | 6/2004 | Witt, Jr. | |

FOREIGN PATENT DOCUMENTS

EP    1238689 A2    9/2002

OTHER PUBLICATIONS

Wordstar General Information Manual, MicroPro International Corporation, 1983, pp. 4-1-4-3.
Wordstar Reference Manual, MicroPro International Corporation, 1983, pp. 1-1, 1-2.
International Search Report dated Dec. 16, 2005 from the corresponding PCT/GB2005/003477.

(Continued)

*Primary Examiner* — James S McClellan
(74) *Attorney, Agent, or Firm* — Lerner, David, Littenberg, Krumholz & Mentlik, LLP (57) ABSTRACT

Data processing apparatus in which removable storage media store a respective program and associated data, the apparatus comprising: a removable storage medium reader; and means for executing the program from a first removable storage medium which is currently readable by the reader, using data stored on that first removable storage medium, the executing means and/or the program being arranged so that at least a predetermined point within execution of the program, the first removable storage medium may be removed from the reader and a second, different, removable storage medium associated with the reader, so that execution of the program can continue using data read from the second removable storage medium.

20 Claims, 9 Drawing Sheets

OTHER PUBLICATIONS

International Preliminary Report on Patentability dated Dec. 22, 2006 from the corresponding PCT/GB2005/003477.

International Search Report and Written Opinion from the corresponding PCT/GB2005/003477.

International Preliminary Report on Patentability from the corresponding PCT/GB2005/003477.

GB Search and Examination Report from corresponding GB priority Application No. GB0516807.5.

Kyodai: "ancient land of ys manual" 1989, Kyodai Software Inc, XP002352075, p. 3.

GB Search and Examination Report from corresponding GB priority Application No. GB0611496.1.

Gateway to Karos for the BBC Microcomputer Model B; Derek L Haslam; Acornsoft 1983. Available from http://bbc.nvg.org/sw/Acornsoft/GatewayToKaros-doc-SBG30.zip; Accessed Sep. 29, 2005.

ViewIndex for the BBC Microcomputer; Acornsoft Limited 1984, Whole document, particularly section 3; Available from http://www.astro.livjm.ac.uk/~bbcdocs/software/apps/ViewIndex.zip; Accessed 39 Sep. 2005.

MindVision Installer VISE for Windows; Mind Vision Software, Inc, Release 3.6.1 May 4, 2004; Chapter 6, particularly p. 6-48; Available from http://webvise.mindvision.com/pub/windows/InstallerVISEUserGuide.pdf; Accessed Sep. 29, 2005.

WinZip 8.0—Tutorial I; American University of Beirut Academic Computing Center; Whole document, particularly p. 12; Available from http://wwwlb.aub.edu.lb/~acc/Resources/Tutorials/winzip/WinZip%20tutorial.pdf; Accessed Sep. 30, 2005.

Jump Start Preschool deluxe User's Guide; Knowledge Adventure Inc. 1996; See in particular "Listening to Music" on p. 10.

M. Nilsson; ID3 tag version 2.3.0 [online] Feb. 3, 1999; Available from <http://www.id3.org/id3v2.3.0html>; [Accessed Sep. 1, 2006].

European Search Report, EP 07021089, mailed Aug. 5, 2010.

Nonhoff-Arps P: "Dauer-Berieselung MP3-Spieler Fuer Unterwegs Mit Festplattenspeicher Satt" CT Magazin Fuer Computer Technik, Heise Zeitschriften Verlag, Hannover, DE, No. 1,Dec. 31, 2001, pp. 52-54,56/57, XP001092686.

Furini M et al: "Audio-text synchronization inside mp3 files: a new approach and its implementation" Consumer Communications and Networking Conference, 2004. CCNC 2004. First IEEE Las Vegas, NV, USA Jan. 5-8, 2004, Piscataway, NJ, USA,IEEE, Jan. 5, 2004, pp. 522-526, XP010696950.

* cited by examiner

METHOD AND APPARATUS FOR CONTINUOUS EXECUTION OF A GAME PROGRAM VIA MULTIPLE REMOVABLE STORAGE MEDIUMS

This application is a National Phase Application of International Application No. PCT/GB2005/003477 filed Sep. 8, 2005, which claims the benefit under 35 U.S.C. 119 (a-e) of Great Britain No. 0420017.6 filed Sep. 9, 2004, and Great Britain No. 0516807.5 filed Aug. 16, 2005, which are herein incorporated by reference.

BACKGROUND OF THE INVENTION

This invention relates to data processing.

As an example of data processing, electronic games are well known and may be supplied on a variety of distribution media, such as magnetic and/or optical discs. General computers or more dedicated games consoles may be used to play these games.

It is known for games to make use of audio and/or video files that are stored on the distribution medium. For example, karaoke games such as the Sony® SingStar™ game are known in which a player sags into a microphone connected to the computer or games console. The computer or games console may display video and/or play an audio track, the intention being that the player sings along. Lyrics and/or notes may be displayed to the player so that the player knows what to sin and at what pitch.

Only a limited number of audio/video files may be stored on the distribution medium. As such, the player has only a limited number of tracks to select when playing the game.

One prior art game is known to allow (i) a "general" music CD (not related to the game) to be inserted into the computer or games console and (ii) the player to select a track from this general music CD as the audio file to be played.

Another prior art game is known to allow a player to insert an "expansion disc" into the computer or games console, the expansion disc being a medium that simply acts as an audio/video data storage medium.

It is known to release different versions of a game. Such different versions often have enhancements, such as new game functionality. Additionally, the different versions may have different audio/video files stored on them, for example to entice a user to purchase the game. However, when playing one version of a game, if the player wishes to play a track from another version of that game, it is necessary to exit the current game version and load the another game version into the computer or games console. This is often time consuming and detracts from the enjoyment of the game.

SUMMARY OF THE INVENTION

This invention provides data processing apparatus in which removable storage media store a respective program and associated data, the apparatus comprising:

a removable storage medium reader; and means for executing the program from a first removable storage medium which is currently readable by the reader, using data stored on that first removable storage medium, the executing means and/or the program being arranged so that at at least a predetermined point within execution of the program, the fast removable storage medium may be removed from the reader and a second, different, removable storage medium associated with the reader, so that execution of the program can continue using data read from the second removable storage medium.

Various further respective aspects and features of the invention are defined in the appended claims.

The invention recognises that different versions of (for example) a game may comprise different sets of data (e.g. audio/video files). According to embodiments of the present invention, when the player is playing a first version of the game, then that player does not have to reset the games console and load in a second version of the game if the player wishes to play the game using data (e.g. an audio/video file) that does not form part of the currently-played version of the game but does form part of another version of the game.

Embodiments of the invention will now be described, by way of example only, with reference to the accompanying drawings in which:

DETAILED DESCRIPTION

Figure 1:
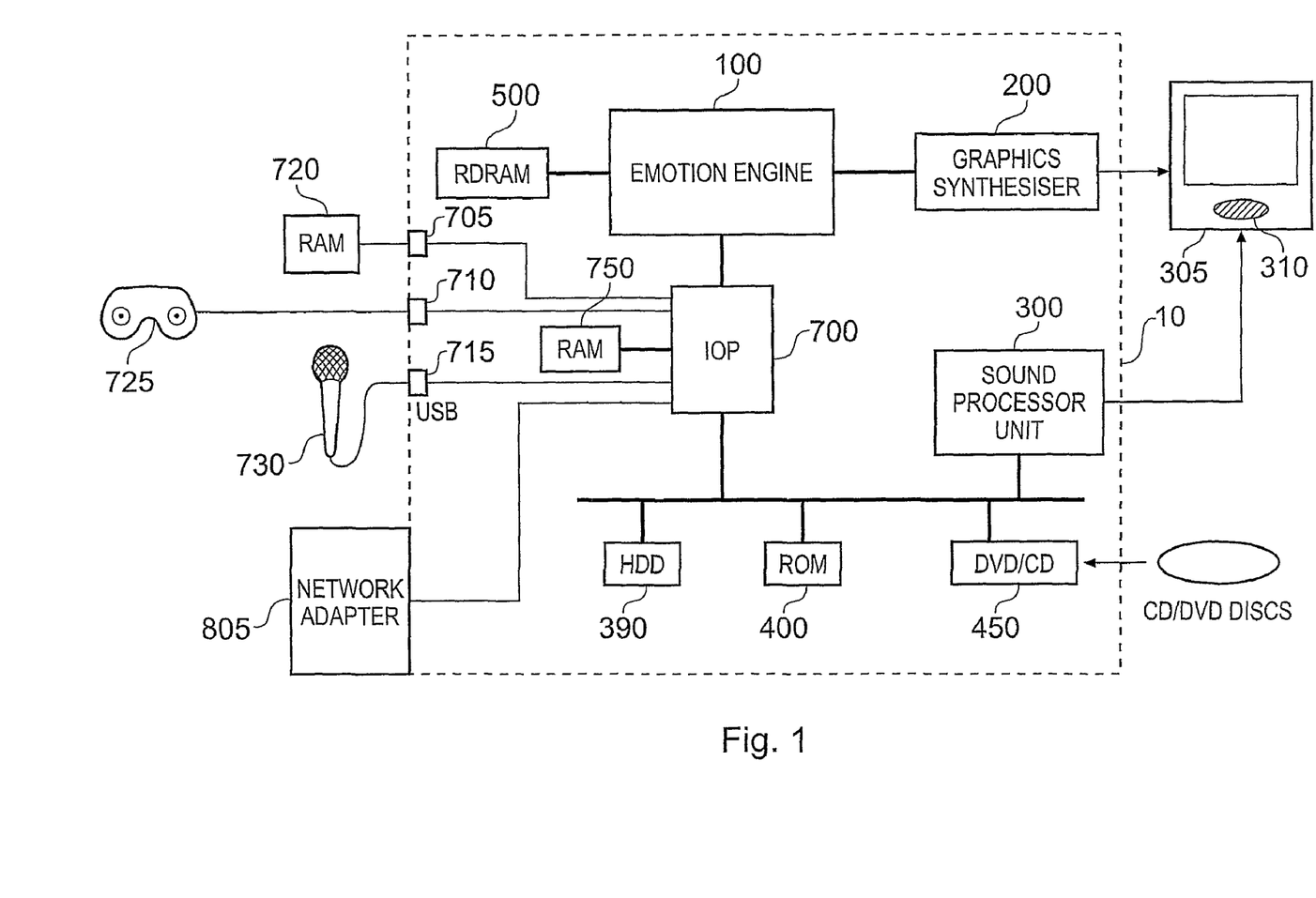
FIG. 1 schematically illustrates the overall system architecture of the PlayStation2.

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) equal hard disk drive (HDD) 390 may be connected.

The input/output processor 700 has two Universal Serial Bus (USB) ports 715 and an iLink or IEEE 1394 port (iLink is the Sony Corporation implementation of the IEEE 1394 standard). The IOP 700 handles all USB, iLink and game controller data traffic. For example when a user is playing a game, the IOP 700 receives data from the game controller and directs it to the Emotion Engine 100 which updates the current stats of the game accordingly. The IOP 700 bas a Direct Memory Access (DMA) architecture to facilitate rapid data transfer rates. DMA involves transfer of data from main memory to a device without passing it through the CPU. The USB interface is compatible with Open Host Controller Interfere (OHCI) and can handle data transfer as of between 1.5 Mbps and 12 Mbps. Provision of these interfaces means that the PlayStation2 is potentially compatible with peripheral devices such as video cassette recorders (VCRs), digital cameras, microphones, set-top boxes, printers, keyboard, mouse and joystick.

Generally, in order for successful data communication to occur with a peripheral device connected to a USB port 715, an appropriate piece of software such as a device driver should be provided. Device driver technology is very well known and will not be described in detail here, except to say hat the skilled man will be aware that a device driver or similar software interface may be require in the embodiment described here.

In the present embodiment, a USB microphone 730 is connected to the USB port. It will be appreciated that the USB microphone 730 may be a hand-held microphone or may form part of a head-set that is worn by the human operator. The advantage of wearing a head-set is that the human operator's hand are free to perform other actions. The microphone includes an analogue-to-digital converter (ADC) and a basic hardware-based real-time data compression and encoding arrangement, so that audio data are transmitted by the microphone 730 to the USB port 715 in an appropriate format, such as 16-bit mono PCM (an uncompressed format) for decoding at the PlayStation 2 system unit 10.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The system unit 10 may be connected to a network adapter 805 that provides an interface (such as an Ethernet interface) to a network. This network may be, for example, a LAN, a WAN or the Internet. The network may be a general network or one that is dedicated to game related communication. The network adapter 805 allows data to be transmitted to and received from other system units 10 that are connected to the same network, (the other system units 10 also having corresponding network adapters 805).

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, track and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth be en a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for DVDs.

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

Figure 2:
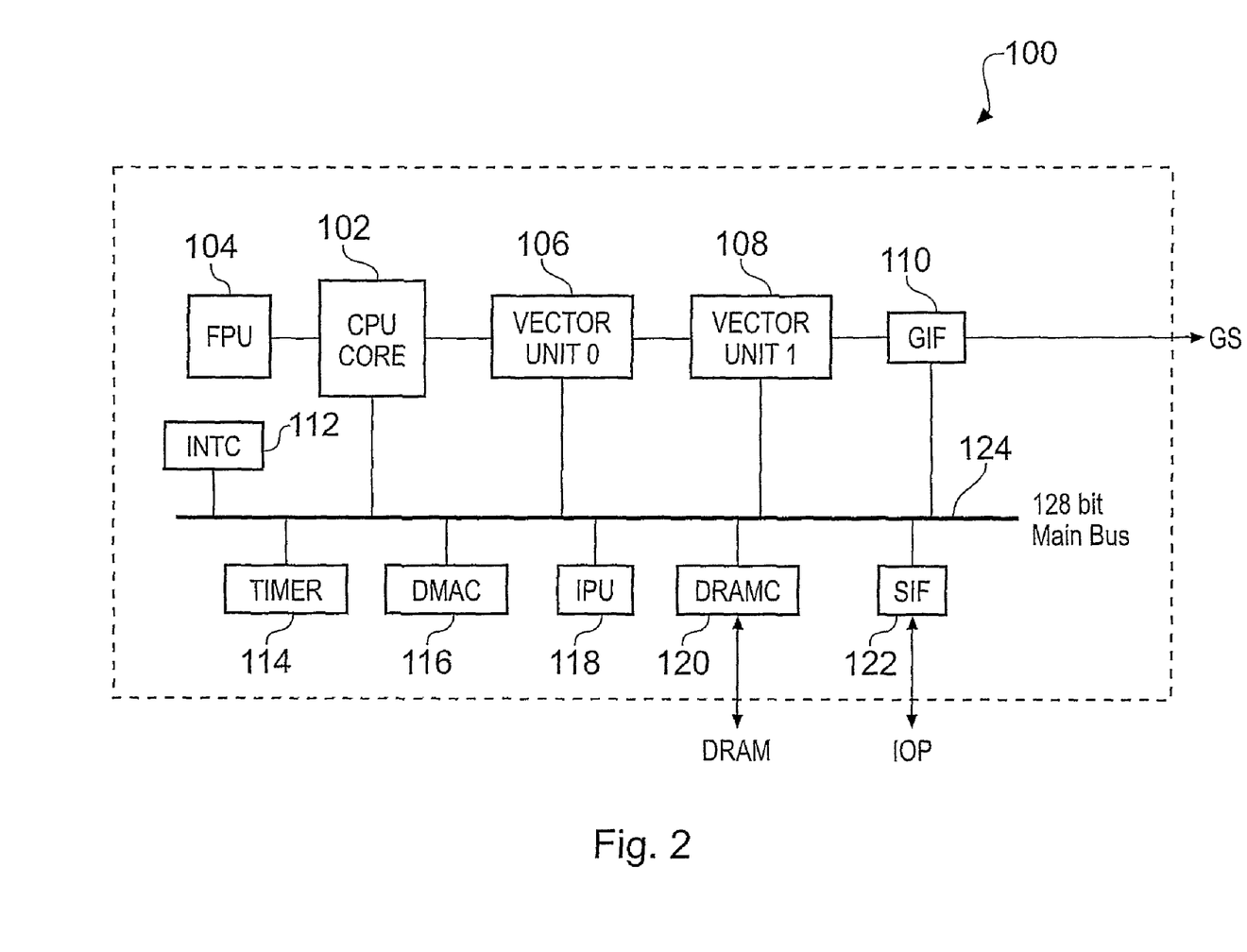
FIG. 2 schematically illustrates the architecture of an Emotion Engine.

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 118; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MPS IV RISC instructions together with additional multimedia instructions MIPS III add IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a it co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing micro-programs and interface with the rest of the system via Vector Interface Units (VIFs). Vector unit zero 106 can work as a coprocessor to the CPU core 102 via a dedicated 128-bit bus so it is essentially a second specialised FPU. Vector unit one 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips mad storage devices.

Figure 3:
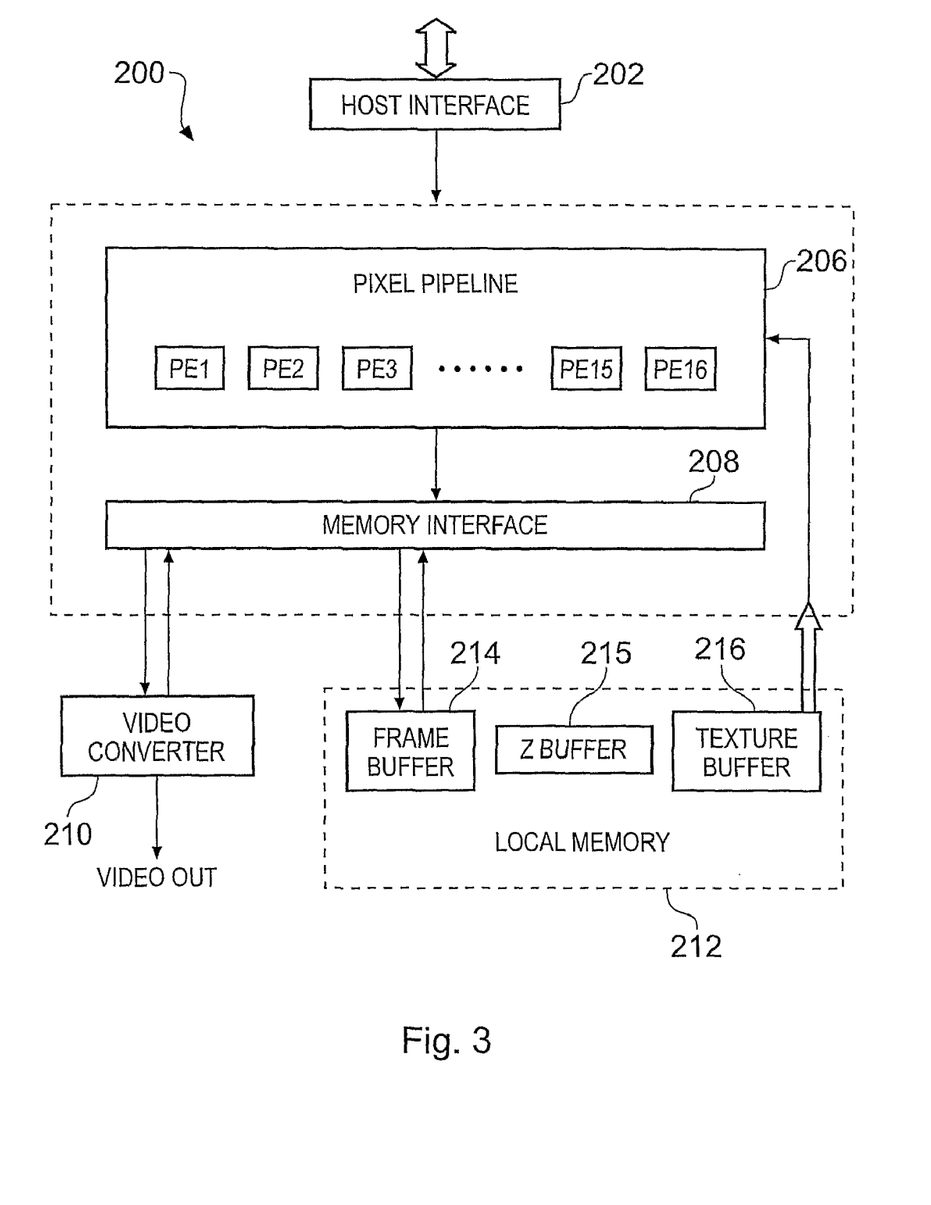
FIG. 3 schematically illustrates the configuration of a Graphics Synthesiser.

FIG. 3 schematically illustrates the configuration of the Graphic Synthesiser 200. The Graphics Synthesiser comprises: a host interface 202; a set-up/rasterizing unit; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending and determines the final drawing colour based on the calculated pixel information.

The pixel pipeline 206 comprises 16 pixel engines PE1, PE2, ..., PE16 so that it call process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame bilker 214 is the portion of video memory where pixel data such as colour information is stored.

The Graphics Synthesiser uses a 2D to 3D texts mapping process to add visual detail to 3D geometry. Each texture may be wrapped around a 3D image object and is stretched and skewed to give a 3D graphical effect. The texture buffer is used to store the texture information for image objects. The Z-buffer 215 (also knows as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the fame memory in a specified output format.

Figure 4:
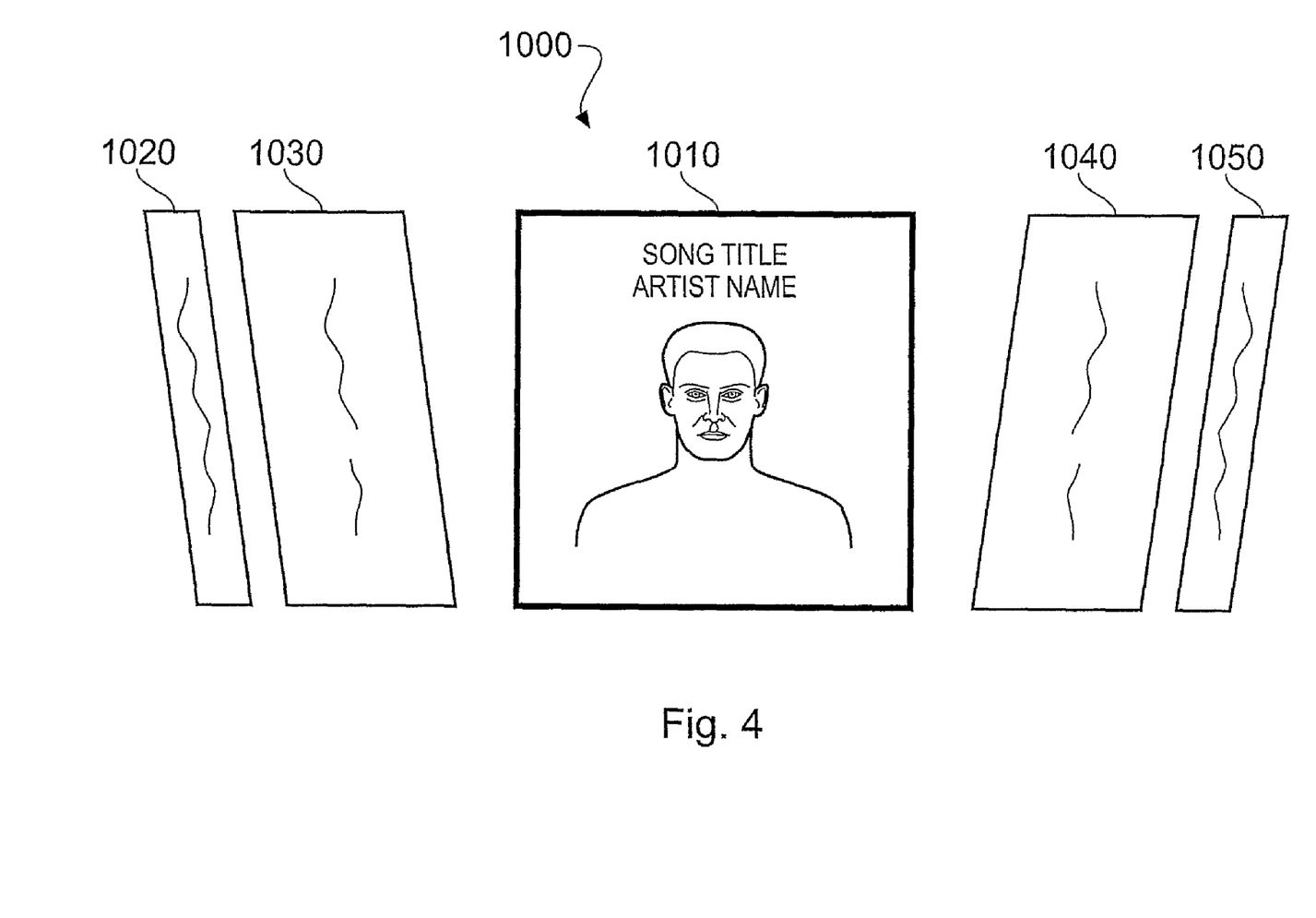
FIG. 4 schematically illustrates a carousel method of selecting an audio/video file.

FIG. 4 schematically illustrates a carousel method of selecting an audio/video file to be played during a so-called karaoke game. In this embodiment, the karaoke game is being played on a PlayStation2 games console, although it will be appreciated that different embodiments may make use of different games consoles (which may be general computers or more dedicated games machines). It will also be appreciated that embodiments are not limited to these karaoke games, but also include say other system in which an audio/video file may be selected. Furthermore, it will be appreciated that the embodiments are not limited to audio/video files, but other data files may be displayed for selection by a user.

In this example shown in FIG. 4, a number (for example 30) of audio/video track icons are displayed in a carousel arrangement 1000 on the display output device 305, with a currently selected audio/video track icon 1010 being displayed closest to the player. Other audio/video track icons 1020, 1030, 1040, 1050, etc. are shown as though they form part of a large circular carousel. The player may interact with the games console via an input device, such as the hand-held game controller 725, to rotate the carousel, so that the next audio/video track icon is selected. The selection may be forwards or backwards in direction. For example, if the player presses a "left" key on the hand-held game controller 725, the carousel might move leftwards so that the audio/video track icon 1040 becomes the currently selected audio/video track icon.

Once the player has found the audio/video track that he wishes to use, he informs the games console of this fact, for example by depressing a button on the hand-held game controller 725, and an audio/video track corresponding to the currently selected audio/video track icon is played by the games console.

Figure 5:
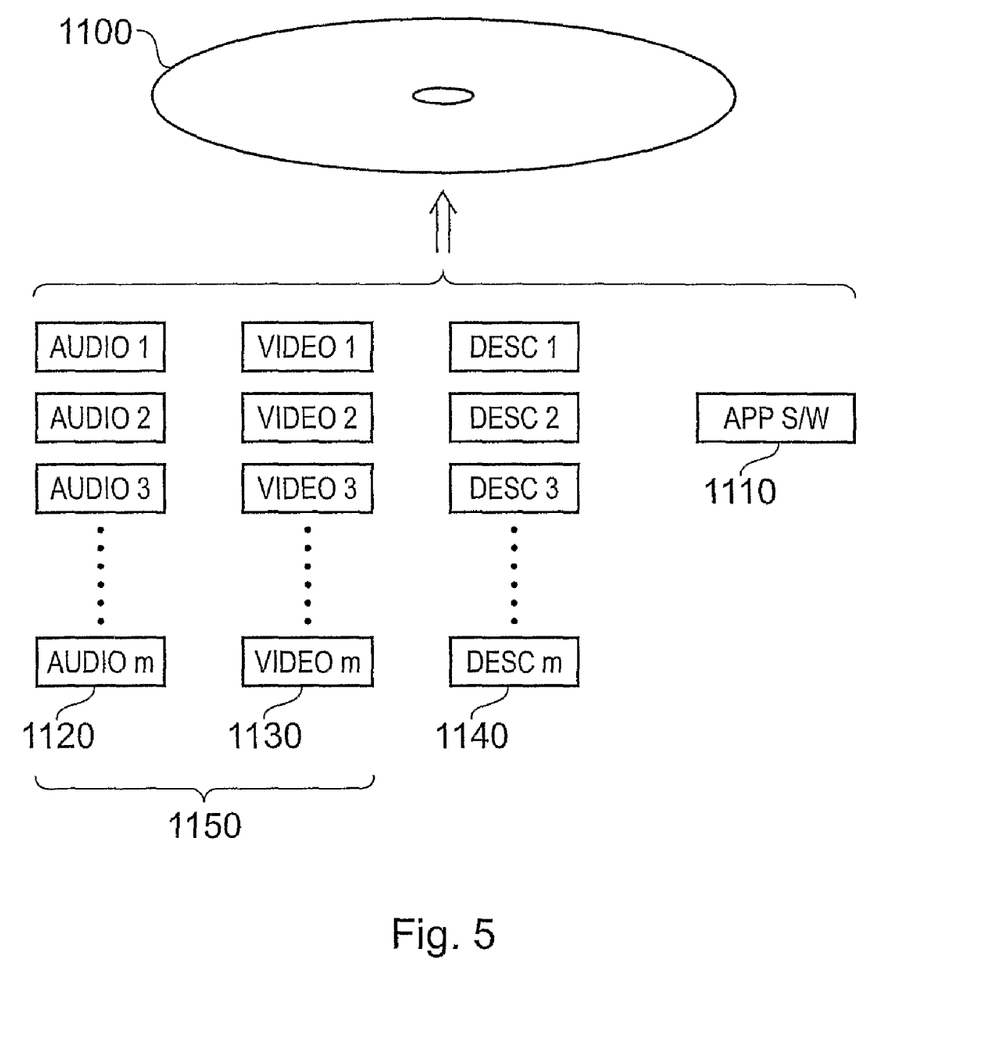
FIG. 5 schematically illustrates a distribution medium.

FIG. 5 schematically illustrates a distribution medium 1100 and the data stored on the distribution medium 1100. In his example, the distribution medium 1100 is a DVD, although it will be appreciated that other embodiments may make use any other form of distribution medium that is compatible with the games console.

The distribution medium 1100 stores application software 1110 for the game. Typically, the application software 1110 comprises one or more software files (such as executable files, dynamic link libraries (DLLs), etc.) Additionally, the application software 1110 may comprise one or more other data files which may, for example, contain configuration data.

For the current karaoke game, the distribution medium 1100 also stores one or more audio files 1120. Each of the audio files 1120 comprises audio data relating to a song that the player of the karaoke game is to sing along to. For each of the audio files 1120, the distribution medium 1100 also stores a corresponding video file 1130 and a corresponding description file 1140. Each of the video files 1130 comprises video data relating to a video sequence that is to be displayed whilst the corresponding audio file 1120 is being played. The description files 1140 will be described in more detail later.

In FIG. 5, there are m audio files 1120, m video files 1130 and m description files 1140. It will be appreciated that other arrangements of the audio files 1120, the video files 1130 and the description files 1140 are possible. For example: (i) an audio file 1120 and its corresponding video file 1130 may be merged into one multiplexed audio/video file; (ii) one of the video files 1130 may be associated with more than one of the audio files 1120; and/or (iii) the description files 1140 may be merged into one unified description file.

An audio file 1120 and its corresponding video file 1130 shall be referred to collectively as an audio/video file 1150 (whether or not the audio file 1120 and the video file 1130 are stored as separate files on the distribution medium 1100 or as a single multiplexed file).

Different versions of the karaoke game may comprise different sets of audio/video files 1150 (and correspondingly different description files 1140). According to the present embodiment, when the player is playing a first version of the game, then that player does not have to reset the games console and load in a second version of the game if the player wishes to play the game using an audio/video file 1150 that does not form part of the first version of the game but does form part of the second version of the game.

Figure 6:
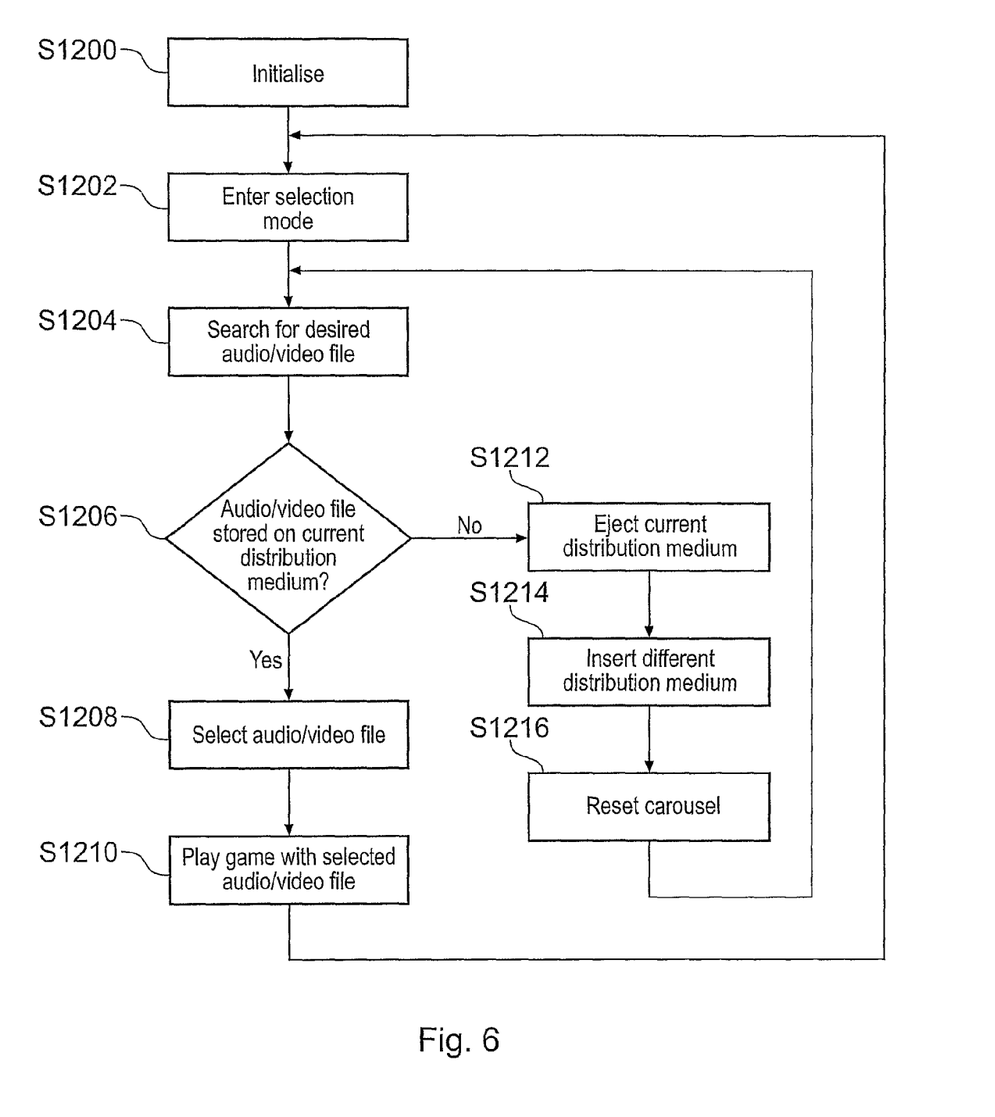
FIG. 6 is a schematic flowchart illustrating the steps involved in selecting an audio/video file.

FIG. 6 is a schematic flowchart illustrating the steps involved in selecting an audio/video file 1150 when playing the karaoke game.

At a step S1200, the games console is initialised with the version of the game software application 1110 that is stored on the distribution medium 1100 that is currently loaded into the games console. For the present embodiment, this is the only tie that the games console needs to be initialised with the software application 1110 whilst the game is being played.

At a step S1202, the player controls the game (for example using the hand-held game controller 725) to enter into a selection mode whereby the carousel arrangement 1000 shown in FIG. 4 is displayed. This can form a suitable time for the user to eject the current distribution medium 1100 and insert another, as described below.

At a step S1204, the player interacts with the carousel arrangement 1000 to search for a desired audio/video file 1150 (using a method as described with reference to FIG. 4). If, at a step S1206, the player is able to locate the desired audio/video file 1150 (i.e. the desired audio/video file 1150 is stored on the distribution medium 1100 that is currently loaded into the games console) then, at a step S1208, the player selects the desired audio/video file 1150 (using a method as described with reference to FIG. 4). Then, at a step S1210, the games console makes use of the selected audio/video file 1150 so that the player can play the game. Once the player has finished his turn, processing returns to the step S1202.

If, at the step S1206, the player is not able to locate the desired audio/video file 1150 (i.e. the desired audio/video file 1150 is not stored on the distribution medium 1100 that is currently loaded into the games console) then, at a stop S1212, the player may instruct the games console to eject the distribution medium 1100 that is currently loaded into the games console. This may be achieved, for example, by depressing a button on the hand-held game controller 725. Alternatively, the player may depress a button on the games console.

At a step S1214, the player insert a different distribution medium 1100 into the games console. Preferably, this newly inserted distribution medium 1100 stores the audio/video file 1150 that the player desires.

At a step S1216, the audio/video files 1150 that are stored on the newly inserted distribution medium 1100 are detected by the games console under the control of the application software 1110. The carousel arrangement 1000 show in FIG. 4 is then updated according to the newly detected audio/video files 1150. Control then returns to the step S1204 at which the player searches for the desired audio/video file 1150.

Therefore, according to the present embodiment, the player may request the games console to eject the distribution medium 1100 that was used to initialise the games console with the present (first) version of the game. The player may then insert a distribution medium 1100 containing a different (second) version of the game into the games console. The audio/video files 1150 stored on this newly inserted distribution medium 1100 are then detected. The carousel arrangement 1000 as shown in FIG. 4 for displaying the audio/video files 1150 is then updated according to the newly detected audio/video files 1150 from the newly inserted distribution medium 1100. Here, references to "first" and "second" versions refer to the order in which the distribution media were inserted into the games console, not to the release order of the versions.

It will be appreciated that the audio/video track icons displayed on the carousel arrangement 1000 at the step S1216 may simply correspond to the audio/video files 1150 from the newly inserted distribution medium 1100. Alternatively, the games console may store (in memory for example) a description of the audio/video files 1150 from the first distribution medium 1100 (for example, the corresponding audio/video track icons which may form part of the corresponding description files 1140), so that when the second distribution medium 1100 is present in the games console, the carousel arrangement 1000 may display audio/video track icons corresponding to the audio/video files 1150 from both the At and second distribution media 1100. If the player then selects, at the step S1208, an audio/video file 1150 that is not stored on the distribution medium 1100 currently present m the games console, the player is prompted (e.g. by a screen message) to insert the appropriate distribution medium 1100 into the games console.

The present embodiment therefore allows the player to have access to the audio/video files 1150 from a different version of the game being played without having to (i) reboot the games console or (ii) ext the current game and restart the new game.

It will also be appreciated that the player may have access to more than two distribution media 1100, each storing a different version of the game, and that the above process may be used to allow the player to access any of the audio/video files 1150 stored on any of these distribution media 1100.

It will be appreciated that the game application software 1110 itself may be loaded into the memory of the games console so that the sole purpose of interchanging distribution media 1100 is simply to allow the player to access different audio/video files 1150 without having to restart the game.

To facilitate playing the game, it is often necessary to have so-called description files 1140 stored on the distribution medium 1100 in association with the audio/video files 1150 (as shown in FIG. 5). For example, these description files 1140 may contain the lyrics and/or notes of a song, and a karaoke game displays this information to allow a player to sing along with a song. A conventional general music CD cannot therefore be used for such a karaoke game as it is not designed/manufactured with such description files 1140. Also, it may be that the audio/video files are encrypted, or at least access to them is restricted. A conventional CD or the like is not compatible with such access restrictions.

Furthermore, "expansion discs" containing purely audio/video data files 1150 (and possibly description files 1140) do not store the actual game application software 1110 that is used to initialise the games console and control the game play. Thus, in alternative games that make use of such expansion discs, if a player wishes to play the game using an audio/video file 1150 that is not stored on a distribution medium containing the application software 1110 but that is instead stored only on an expansion disc, then that player requires both the distribution medium containing the application software 1110 and the expansion disc. According to the present embodiment however, the desired audio/video file 1150 is stored on a distribution medium 1100 that also stores application software 1110 for playing the game.

Figure 10:
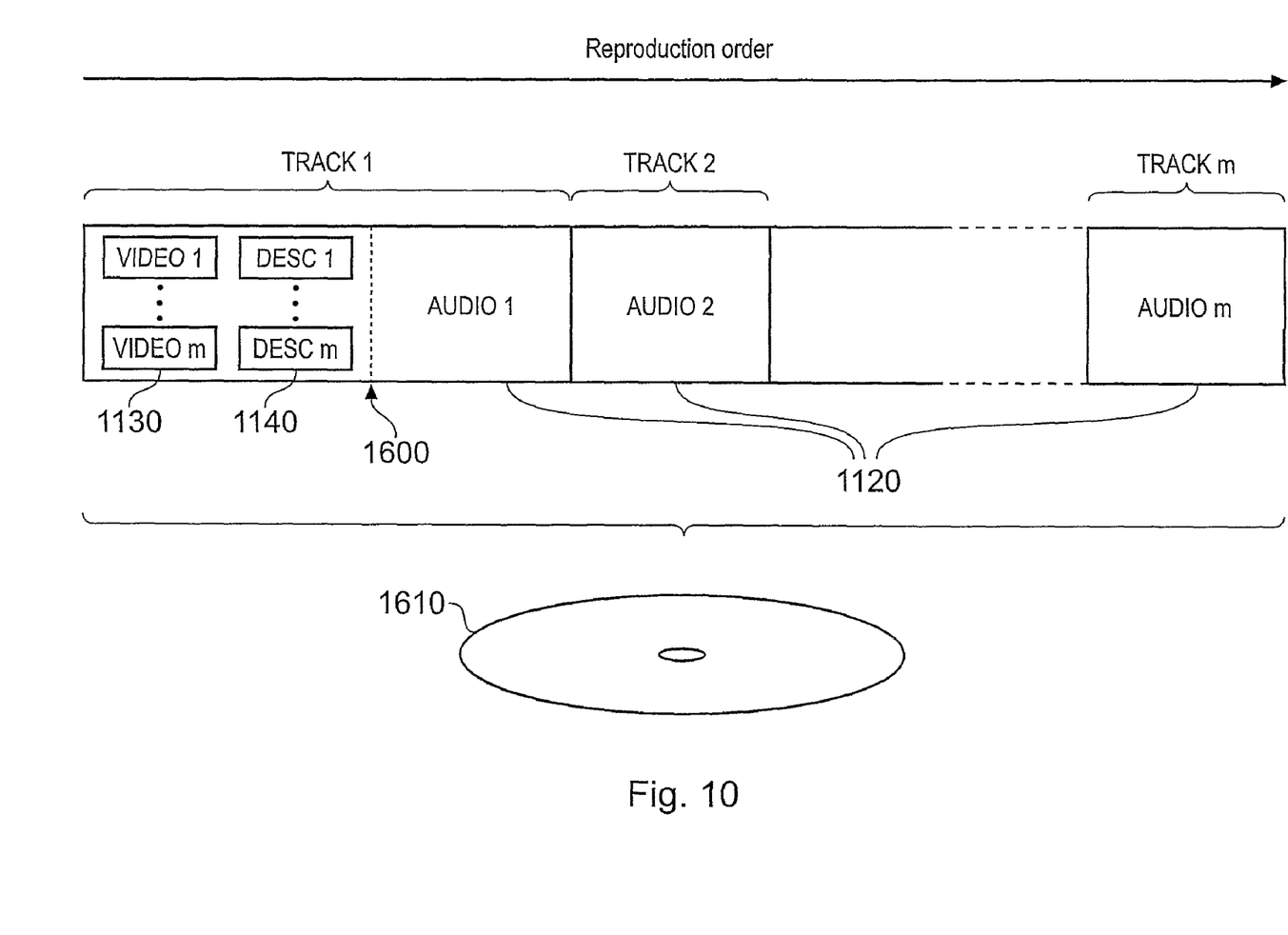
FIG. 10 schematically illustrates the storage of files on a distribution medium according to an embodiment of the invention.

FIG. 10 schematically illustrates an alternative embodiment of the invention in which the desired audio files 1120 are stored on a CD 1610 in the same way that audio data (tracks) are stored on a conventional general music CD. However, the first audio track comprises not only the audio data of the audio file 1120 corresponding to that first audio track, but also the data of the description files 1140 and preferably (but not necessarily) the video files 1130 corresponding to each of the audio files 1120, the video files 1130 and the description files 1140 being encoded as audio data. (Again, it will be appreciated that the arrangement of the video files 1130 and the description files 1140 as separate files is purely exemplary and these files may, for example, be combined into one or more other files). The video files 1130 and description files 1140 precede (in the reproduction order of data on a conventional general music CD) the audio file 1120 within the first audio track.

It is known to use an offset value for indicating, to a conventional general music CD player, the point within an audio track at which reproduction of that audio track is to commence. This may be specified, for example, in a table-of-contents of the CD (not shown in FIG. 10). Therefore, according to this embodiment, an offset value for the first audio track is specified to be the position 1600 at which the data for the video files 1130 and the description files 1140 end and the audio file 1120 for the first audio track commences (although it will be appreciated that the offset value may be at any position after the video files 1130 and the description files 1140). As such, when the CD 1610 is used with a conventional general music CD player, the reproduction of the first audio track will begin with the corresponding audio file 1120 and will not reproduce (as audio) the video files 1130 and the description files 1140. Thus, the CD 1610 may be used in the same way as a conventional general music CD in a conventional general music CD player. However, the CD 1610 may also be used as a distribution medium to supply additional audio files 1120 (and associated video files 1130 and description files 1140) for the karaoke game (as has been described above), the game being arranged to detect the use of such a CD 1610 and to identify the location of the audio files 1120, the video files 1130 and the description files 1140.

It is possible that some conventional general music CD players may allow the user to reproduce the first audio track from a position preceding the offset value for the first audio track (for example, if the first audio track is being played and the user scans backwards through the first audio track). Preferred embodiments of the invention therefore encode the data for the video files 1130 and the description files 1140 on the CD 1610 so that, if reproduced as audio, the output audio is of a low volume. Whilst this increases the amount of data required to store the video files 1130 and the description files 1140 on the CD 1610, this prevents a user's speakers from being damaged if the data of the video files 1130 and the description files 1140 are reproduced as audio. This encoding of the video files 1130 and the description files 1140 may be achieved, for example, by only using one or more of the least-significant-bits (LSBs) allocated to an audio sample to limit the dynamic range of the output audio relative to the full possible dynamic range achievable from all of the bits allocated to an audio sample of the audio files 1120. It will be appreciated that the one or more of the most-significant-bits (MSBs) of an audio sample that are not used for encoding the video files 1130 and the description files 1140 may be used instead for other purposes. For example, if the MSBs are used to represent an actual audio signal, such as music or speech, then on reproduction of this section of the audio track, this music or speech will be reproduced as a dominant audio signal, due to using the MSBs, with a small amount of noise resulting from the reproduction as audio of the video files 1130 and the description files 1140 encoded as LSBs.

It will be appreciated that the video files 1130 and the description files 1140 may be stored within one or more audio tracks other than or in addition to the first audio track, with the CD carrying offset values appropriate to the or each of the audio tracks being used to store the video files 1130 and the description files 1140 so that a conventional general music CD player will not reproduce the video files 1130 and the description files 1140 as output audio.

Whilst the embodiment illustrated in FIG. 10 has been described with respect to CDs, it will be appreciated that this applies equally to other distribution media (such as super-audio CDs, music DVDs, etc). In this case, the video files 1130 and the description files 1140 may be stored as audio data anywhere within an audio track (not necessarily preceding the audio files 1120 in the reproduction order), with the distribution medium storing information that a reproduction apparatus may use to determine a portion of an audio track to be reproduced as output audio and a portion of the audio track (corresponding to the video files 1130 and the description files 1140) which, although represented as audio data, is not to be reproduced as output audio.

Different versions of the game may require different or additional information about the audio/video files 1150. This information may be stored in the description files 1140. However, when a current version of a game attempts to make use of an audio/video file 1150 from a distribution medium 1100 for an earlier version of the game, the earlier version may not have the necessary information for some of the features of the current version being played. This is illustrated schematically in FIG. 7 in which a description file 1300 from the earlier version of the game contains information relevant to a particular audio/video file 1150 stored on a distribution medium 1100 for that earlier version of the game, whilst a description file 1310 from a current (later) version of the game contains information relevant to a different audio/video file 1150 that is stored on a distribution medium 1100 for the current version of the game.

Figures 7, 8:
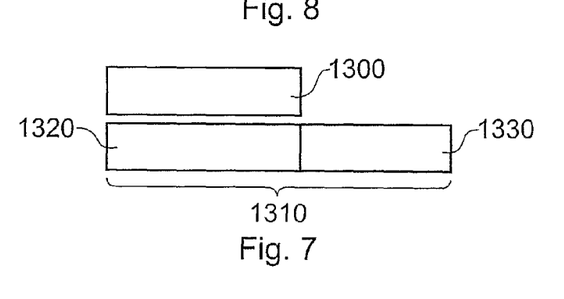
FIG. 7 schematically illustrates description files.
FIG. 8 schematically illustrates two distribution media.

The description file 1310 may be of an entirely different format to the description file 1300 due to features of the current version of the game that have been introduced or changed since the earlier version of the game. Alternatively, the description file 1310 may comprise a data portion 1320 (similar in format to the description file 1300) containing information for features of the earlier version of the game and a data portion 1330 containing information for features of the current version of the game.

It will be appreciated that a variety of formats may be used for the description files 1140 (1300 and 1310). However, in preferred embodiments, the format used is XML.

FIG. 8 schematically illustrates two distribution media 1100a and 1100b that store application software 1110a and 1110b respectively, the application software 1110a being for an earlier version of the game and the application software 1100b being for a current (later) version of the game. The distribution medium 1100a stores m audio/video files 1150a and corresponding description files 1140a. The description files 1140a are of the format of the description file 1300 of FIG. 7. The distribution medium 1100b stores n audio/video files 1150b and corresponding description files 1140b. The description files 1140b are of the format of the description file 1310 of FIG. 7.

According to the present embodiment, the distribution medium 1100b also stores additional description files 1400. There are m additional description files 1400, one for each of the audio/video files 1150a stored on the distribution medium 1100a. Each additional description file 1400 may be a self-contained description file, i.e. an entire description file of the same format as the description files 1140b. Alternatively, the additional description files 1400 may comprise the necessary data so that, when combined with the description files 1140a, they form a description file 1310 as show in FIG. 7 (with the description file 1140a forming the data portion 1320 and the additional description file 1400 forming the data portion 1330).

It will be appreciated that the distribution medium 1100b could store additional description files 1400 that correspond to more than one earlier version of the game. It will also be appreciated that the additional description files 1400 may be stored in an alternative arrangement. For example, instead of storing m individual additional description files 1400, the additional description files 1400 may be stored as one unified additional description file 1400.

Therefore, according to the present embodiment, the distribution medium 1100 for a version of the game may store description files 1140 not only for the audio/video files 1150 associated with that version, but also additional description files 1400 for audio/video files 1150 of earlier versions. When a current game version is loaded by the games console, the description files 1140 and 1400 (being small in size) may be loaded into the memory of the games console. When an audio/video file 1150 of an earlier version is selected, the appropriate up-to-date description information may then be used instead of the description information stored on the distribution medium 1100 for this earlier version.

In preferred embodiments of the invention, the distribution medium 1100 stores a table-of-contents, which may be, for example, an XML file. This table of contents has an entry for the current version of the game (i.e. the version corresponding to the distribution medium 1100) and zero or more entries corresponding to other versions of the game. Each of the entries in the table-of-contents comprises an identification of the particular data on the distribution medium 1100 that is appropriate to the corresponding game version. For example, an entry in the table-of-contents may identify: (i) which audio files 1120 and/or video files 1130 are appropriate to the corresponding game version; (ii) which description files 1140 (and/or additional description files 1400) are appropriate to the corresponding game version; and (iii) which parts (1320, 1330) of a description file 1140 (and/or additional description file 1400) are appropriate to the corresponding game version.

It will be appreciated that entries of the table of contents may contain incremental inflation, i.e. an entry may identify the particular data on the distribution medium 1100 that is appropriate to the corresponding game version but that is not appropriate to an earlier game version corresponding to another entry of the table-of-contents.

The software application 1110, being aware of its own game version, uses the table-of-contents on the distribution medium 1100 to determine which files/data on the distribution medium 1100 to use. In preferred embodiments, this occurs at the step S1200 of FIG. 6 upon initialisation of the game. In preferred embodiments, this also occurs at the step S1216 of FIG. 6 after a replacement distribution medium 1100 has been inserted into the games console. However, at the step S1216, the table-of-contents of the newly inserted distribution medium 1100 may not have an entry appropriate to the version of the game currently being played, i.e. indicating that the data being stored on the distribution medium is not appropriate (cannot be processed) by the version of the game currently being played. If this occurs, the software application causes a message to be displayed to the user to this effect, prompting the user to insert a distribution medium 1100 appropriate to the version of the game currently being played.

It will be appreciated that, over time, the format of the audio/video files 1150 may be changed. This may be due, for example, to (i) changing the data compression algorithm used for the audio and/or the video data; (ii) changing the sampling frequency of the audio data or the spatial resolution of the video data and/or (iii) altering the distribution medium format (such as moving from a single-layer DVD to a dual-layer DVD). The result of this is that the game application software 1110 for one version of the game may not be able to interpret the audio/video files 1150 stored on a distribution medium 1100 for a different version of the game.

Therefore, the present embodiment arranges the application software 1110 in a modular form so that the functionality for understanding and accessing the audio/video files 1150 (such as data decompression algorithms) is contained in one or more separate modules. These modules could be, for example, DLLs, with the distribution medium storing an audio data decompression DLL and a video data decompression DLL.

Figure 9:
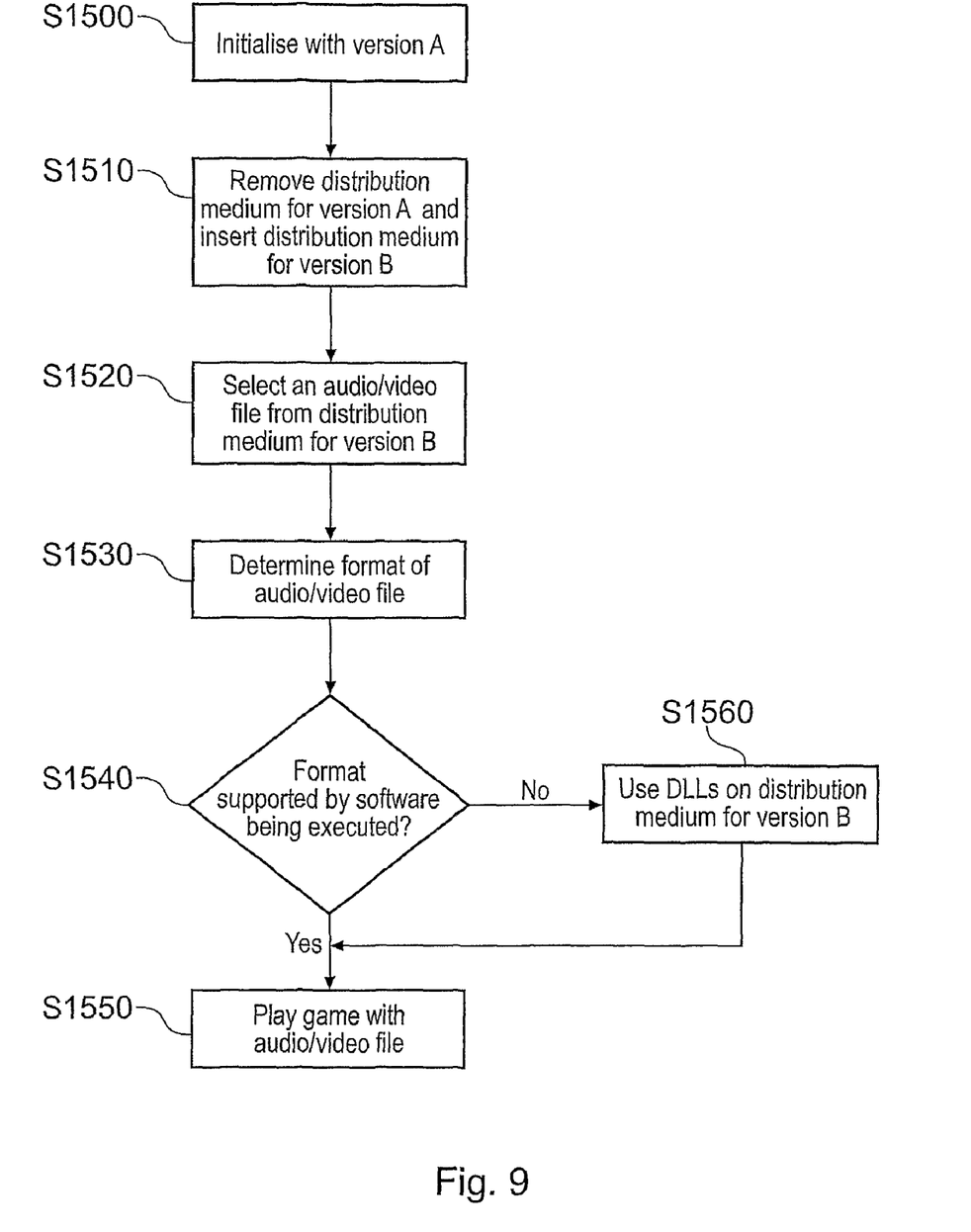
FIG. 9 is a schematic flowchart illustrating the use of software modules.

The use of this modular arrangement (and specifically DLLs) to ensure compatibility between different versions of the game is schematically illustrated in the flowchart of FIG. 9.

At a step S1500, the games console is initialised with the software application 1110 that is stored on the distribution medium 1100 for the game version A.

At a step S1510, the player replaces the distribution medium 1100 for the game version A currently loaded in the games console with the distribution medium 1100 for a different game version B. At a step S1520, the player selects an audio/video file 1150 that is stored on the currently loaded distribution medium 1100 (for game version B). These two steps S1510 and S1520 follow the method as illustrated in FIG. 6.

At a step S1530, the games console, under direction from the application software 1110 being executed by the games console, determines the format of the selected audio/video file 1150.

If, at a sep S1540, it is determined that the format of the selected audio/video file 1150 is supported by the application software 1110 being executed by the games console, processing continues at a step S1550 at which the game is played using the selected audio/video file 1150.

However, if, at the step S1540, it is determined that the format of the selected audio/video file 1150 is not supported by the application software 1110 being executed by the games console, processing continues to a step S1560 at which the application software being executed 1110 makes use of the modules (DLLs) stored on the distribution medium 1100 for game version B (instead of the ones that have been loaded into memory from the distribution medium 1100 for game version A) so that the format of the selected audio/video file 1150 can be supported. This may be performed in any of the well-known ways for loading and using modular software such as DLLs.

Furthermore, according to the present embodiment it is possible to record onto a storage medium, such as the memory card 720, the audio input of a player who is playing the game. It is then possible to play back the recorded audio. It is usual to play back this recorded audio in conjunction with the corresponding audio/video file 1150 which the player was singing along to. However, it will be appreciated that this audio/video file 1150 may be stored on a distribution medium 1100 that is not currently loaded into the games console and hence is not accessible. Therefore, the present embodiment stores information on the memory card 720 alongside the recorded audio describing which distribution medium 1100 or which version of the game is required in order for the correct audio/video file 1150 to be played in conjunction with the recorded audio from the player. This information may be, for example, a version number of the game or textual data describing which distribution medium 1100 is required. This may be used as a visual prompt for the player.

In so far as the embodiments of the invention described above are implemented, at least in part, using software-controlled data processing apparatus, it will be appreciated that a computer program providing such software control, a storage medium by which such a computer program is stored and a transmission medium by which such a computer program is transmitted are envisaged as aspects of the present invention.

The invention claimed is:

1. A data processing apparatus in which at least two removable storage media each store both a respective program and associated data, the apparatus comprising:
 a removable storage medium reader; and
 means for executing the program from a first one of the removable storage media which is currently readable by the reader, using data stored on the first removable storage medium, the executing means and/or the program being arranged so that at at least a predetermined point within execution of the program, the first removable storage medium may be removed from the reader and a second, different, one of the removable storage media associated with the reader, so that execution of the program can continue using data read from the second removable storage medium, in which:
 the programs stored on the removable storage media are such that any of the removable storage media can act as the first one of the removable storage media;
 the data stored on a removable storage medium has associated description data stored on that removable storage medium; and
 one of the removable storage media stores description data relating to data stored on the other removable storage medium and one or more data part identifiers identifying respective parts of the data stored on that removable storage medium that can be processed in accordance with a corresponding version of the program;
 the apparatus comprising:
 means operable to determine, from one or more data part identifiers stored on a removable storage medium associated with the reader, a part of the data stored on that removable storage medium that can be processed in accordance with the version of the program being executed by the apparatus;
 a memory for storing user data relating to data stored on a removable storage medium;
 means for detecting user access of the user data relating to data not stored on a removable storage medium currently associated with the reader; and
 means, responsive to such a detection, for generating a message to prompt the user to associate another removable storage medium with the reader.

2. The apparatus according to claim 1;
 the apparatus being a games machine;
 the program being a games program; and
 the data being games data.

3. The apparatus according to claim 2;
 the program being a music game program; and
 the data being song data.

4. The apparatus according to claim 1, in which the removable storage media are read-only storage media.

5. The apparatus according to claim 4, in which the removable storage media are optical disks.

6. The apparatus according to claim 1, further comprising:
 means, responsive to a determination that no part of the data stored on the removable storage medium associated with the reader can be processed in accordance with the program being executed by the apparatus, for generating a message to prompt the user to associate another removable storage medium with the reader.

7. The apparatus according to claim 1, further comprising a memory for storing the program at least while no removable storage medium is accessible by the reader.

8. The apparatus according to claim 1 in which the program comprises one or more program modules consisting of program code for interpreting the data stored on the removable storage medium.

9. The apparatus according to claim 8 in which the program modules are dynamic link libraries.

10. A data processing apparatus in which at least two removable storage media each store both a respective program and associated data, the apparatus comprising:
- a removable storage medium reader; and
- means for executing the program from a first one of the removable storage media which is currently readable by the reader, using data stored on the first removable storage medium, the executing means and/or the program being arranged so that at at least a predetermined point within execution of the program, the first removable storage medium may be removed from the reader and a second, different, one of the removable storage media associated with the reader, so that execution of the program can continue using data read from the second removable storage medium, in which:
- the programs stored on the removable storage media are such that any of the removable storage media can act as the first one of the removable storage media;
- the data stored on a removable storage medium has associated description data stored on that removable storage medium; and
- one of the removable storage media stores description data relating to data stored on the other removable storage medium and one or more data part identifiers identifying respective parts of the data stored on that removable storage medium that can be processed in accordance with a corresponding version of the program;
- the apparatus comprising:
- means operable to determine, from one or more data part identifiers stored on a removable storage medium associated with the reader, a part of the data stored on that removable storage medium that can be processed in accordance with the version of the program being executed by the apparatus;
- means for generating a user menu to allow user selection of different components of data stored on a removable storage medium;
- means for updating the user menu in response to the second removable storage medium being associated with the reader, the user menu being updated in accordance with the data stored on the second removable storage medium, in which the updated user menu allows a user to select different components of the data stored on the first removable storage medium and the second removable storage medium;
- means for detecting user selection of a data component not stored on the currently accessed second removable storage medium; and
- means, responsive to such a detection, for generating a message to prompt the user to associate another removable storage medium with the reader.

11. The apparatus according to claim 10, in which the updated user menu allows a user to select different components of the data stored on the second removable storage medium.

12. The apparatus according to claim 10, in which the generation of the user menu represents a predetermined point at which the current removable storage medium may be replaced.

13. The apparatus according to claim 10, wherein:
- the apparatus is a games machine;
- the program is a games program; and
- the data is games data.

14. The apparatus according to claim 13, wherein the program is a music game program and the data being song data.

15. The apparatus according to claim 10, in which the removable storage media are read-only storage media.

16. The apparatus according to claim 15, in which the removable storage media are optical disks.

17. The apparatus according to claim 10, further comprising:
- means, responsive to a determination that no part of the data stored on the removable storage medium associated with the reader can be processed in accordance with the program being executed by the apparatus, for generating a message to prompt the user to associate another removable storage medium with the reader.

18. The apparatus according to claim 10, further comprising a memory for storing the program at least while no removable storage medium is accessible by the reader.

19. The apparatus according to claim 10 in which the program comprises one or more program modules consisting of program code for interpreting the data stored on the removable storage medium.

20. The apparatus according to claim 19 in which the program modules are dynamic link libraries.

* * * * *

UNITED STATES PATENT AND TRADEMARK OFFICE
CERTIFICATE OF CORRECTION

PATENT NO. : 7,980,955 B2  Page 1 of 1
APPLICATION NO. : 11/662509
DATED : July 19, 2011
INVENTOR(S) : Richard Eliot Bates and Antonio Garcia It is certified that error appears in the above-identified patent and that said Letters Patent is hereby corrected as shown below:

Col. 1, Line 24, "sags" should read -- sings --.
Col. 1, Line 28, "sin" should read -- sing --.
Col. 2, Line 57, "bas" should read -- has --.
Col. 3, Line 6, "hat" should read -- that --.
Col. 3, Line 7, "require" should read -- required --.
Col. 3, Line 65, "track" should read -- tracks --.
Col. 4, Line 4, "be en" should read -- between --.
Col. 4, Line 51, "instructions" should read -- instructions. --.
Col. 4, Line 52, "add" should read -- and --.
Col. 4, Line 61, "it" should read -- first --.
Col. 5, Line 56, "mad" should read -- and --.
Col. 6, Line 13, "call" should read -- can --.
Col. 6, Line 26, "bilker" should read -- buffer --.
Col. 6, Line 29, "texts" should read -- texture --.
Col. 6, Line 60, "say" should read -- any --.
Col. 7, Line 19, "his" should read -- this --.
Col. 7, Line 35, "Bach" should read -- Each --.
Col. 8, Line 2, "tie" should read -- time --.
Col. 8, Line 33, "insert" should read -- inserts --.
Col. 8, Line 40, "show" should read -- shown --.
Col. 9, Line 3, "At" should read -- first --.
Col. 9, Line 6, "present m the" should read -- present in the --.
Col. 9, Line 13, "ext" should read -- exit --.
Col. 11, Line 58, "show" should read -- shown --.

Signed and Sealed this
Twenty-first Day of August, 2012

David J. Kappos
*Director of the United States Patent and Trademark Office*